Figure 1:
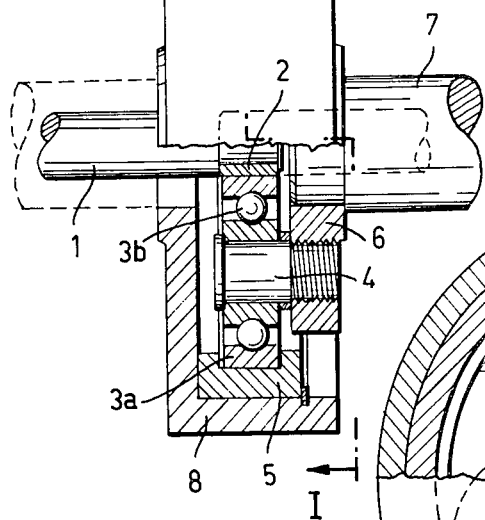

United States Patent [19]

Kanervo et al.

[11] 4,235,128

[45] Nov. 25, 1980

[54] PLANETARY GEAR PROVIDED WITH FRICTION PLANET WHEELS

[76] Inventors: Seppo Kanervo, Mittarikatu 2C, 04400 Därvenpää44; Erkki Rautiainen, Kuusitie 3 C 55, 00270 Helsinki 27, both of Finland

[21] Appl. No.: 888,609

[22] Filed: Mar. 21, 1978

Related U.S. Application Data

[63] Continuation-in-part of Ser. No. 710,034, Jul. 30, 1976, abandoned.

[30] Foreign Application Priority Data

Oct. 12, 1977 [FI]  Finland .................................. 773028

[51] Int. Cl.³ ........................ F16H 13/08; F16C 13/02
[52] U.S. Cl. ........................................ 74/798; 74/206; 308/189 R; 308/216
[58] Field of Search ................ 74/798, 206, 202, 204; 308/207 R, 216, 189 R; 29/148.4 R, 148.4 A

[56] References Cited

U.S. PATENT DOCUMENTS

| | | | |
|---|---|---|---|
| 1,212,462 | 1/1917 | Donnelly | 74/206 |
| 1,368,570 | 2/1921 | Philippeau | 74/798 |
| 1,586,309 | 5/1926 | Hult | 308/189 R |
| 3,469,463 | 9/1969 | Ishikawa | 74/206 |
| 3,471,913 | 10/1969 | Scott | 29/148.4 A |
| 3,475,993 | 11/1969 | Hewko | 74/208 |
| 3,817,125 | 6/1974 | Nakamura et al. | 74/798 |

FOREIGN PATENT DOCUMENTS

2543080  4/1976  Fed. Rep. of Germany ............. 74/798
1347  of 1915  United Kingdom ...................... 74/798

*Primary Examiner*—Allan D. Herrmann
*Attorney, Agent, or Firm*—Ladas & Parry

[57] ABSTRACT

The invention concerns a planetary gear with friction planet wheels, especially for high rotational speeds. One of the gear shafts is connected to a flange further connected to the friction planet wheels transmitting the power. The planet wheels form the sole bearing for the gear casing and both gear shafts.

4 Claims, 7 Drawing Figures

PLANETARY GEAR PROVIDED WITH FRICTION PLANET WHEELS

This is a continuation-in-part of copending application Ser. No. 710,034 filed July 30, 1976, now abandoned.

The present invention relates to a planetary gear with friction planet wheels, a primary shaft and a secondary shaft, a flange being attached to one of the said shafts, either directly or indirectly, and further to the axles of the friction planet sheels transmitting power from one shaft to the other.

A planetary gear of the above mentioned type is known from e.g. GB-patent publication 1090135. However, with the solution described therein no essential advantages are attained as compared to traditional planetary gears.

The object of the invention is to provide a friction planet gear of the above mentioned type which can be placed in a very small space, which is of a simpler and cheaper construction than known planet wheel gears, and which, in addition, tolerates considerably higher rotational speeds than the gears hitherto.

This object is achieved by means of the gear according to the invention in that the outer ring of each of the planet wheels is on its inside mounted as a roller bearing on the respective planet wheel axle connected to one of the gear shafts and the outer ring is further arranged as a roller element between the casing and the other gear shaft. The planet wheels thus act as, a double roller element bearing and constitute the sole radial bearing for both gear shafts.

The feature that the planet wheels form the sole radial bearing for both the gear shafts is very essential in that it enables the sun shaft to rotate at very high speeds. In known gears employing separate conventional bearings for the gear shafts the inner roller elements of these bearings rotate at a speed considerably higher than the shaft and the mechanical strength of these inner roller elements determine the maximum shaft speed to a relatively low value. The gear of the present invention has eliminated this problem and well enables a rotational speed of e.g. 100,000 r.p.m., a speed which not at all can be contemplated in connection with prior gears.

Transmission of high power requires a great pressure between the outer casing and the outer ring of the planet wheels in order to obtain necessary friction therebetween. This great pressure causes a deformation of the outer ring making it slightly oval which in turn causes highpoint pressures on the inner roller elements of the planet wheels and an increased rolling resistance, all this resulting in a relatively rapid wearing of the inner roller elements. In order to overcome this problem a preferred embodiment of the invention is characterized in that the inner ring of each planet wheel is deformed to an oval form corresponding to the deformation of the outer ring. This is preferably achieved by dimensioning the axle upon which the inner ring is mounted slightly greater than the normal diameter of the inner ring in a direction perpendicular to the respective radius of the gear. For this may be used a so-called lightened axle which does not fill the inner ring entirely, or an axle of oval cross section entirely filling the inner ring.

The gear of the invention is of a simple and compact structure and since ordinary mass-produced standard bearing elements can be used as structural parts it is also cheap.

Figure 2:
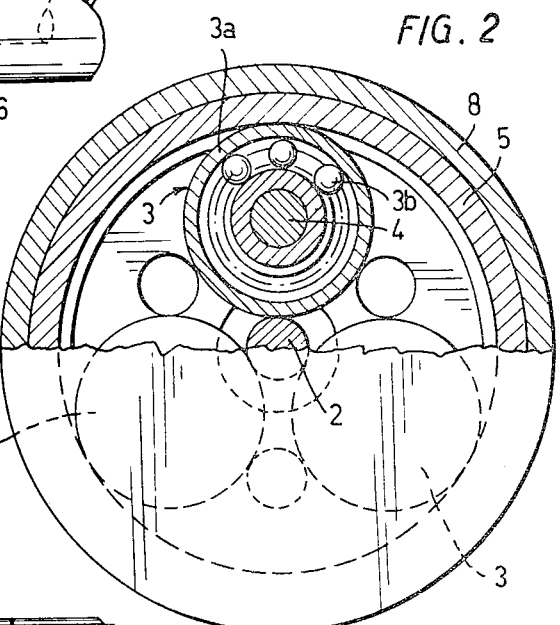
Figure 5:
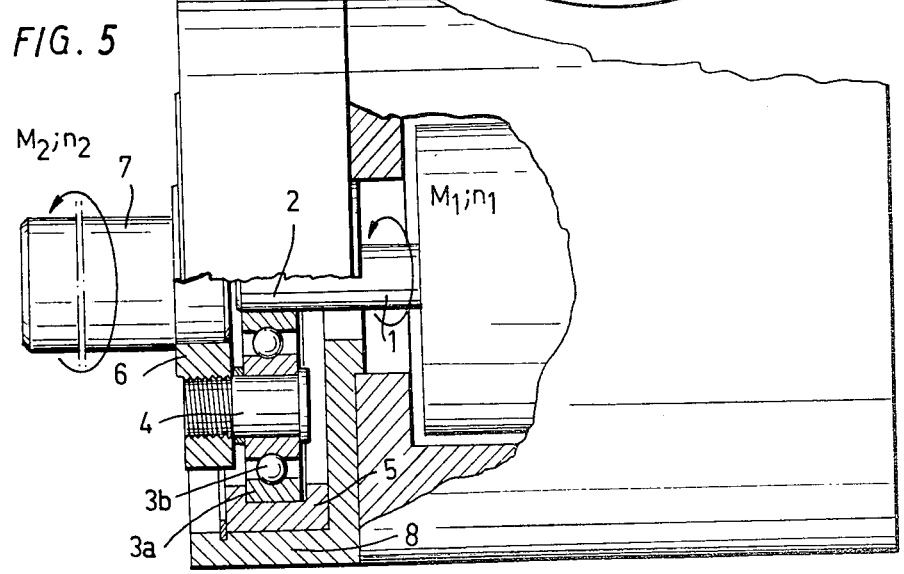
Figure 3:
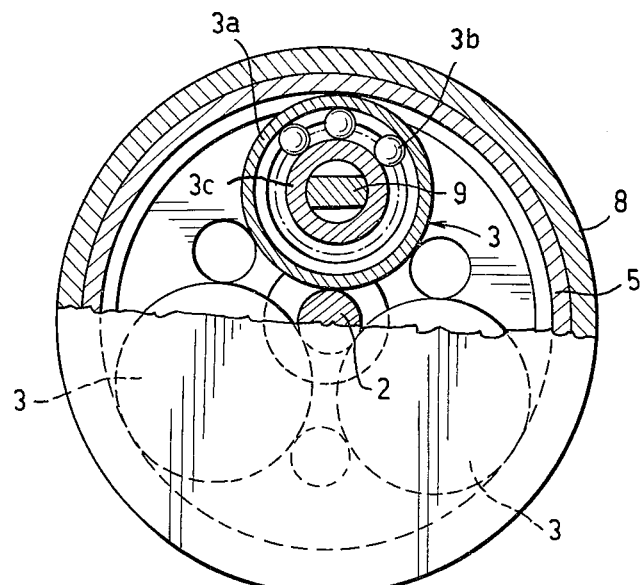
Figure 4:
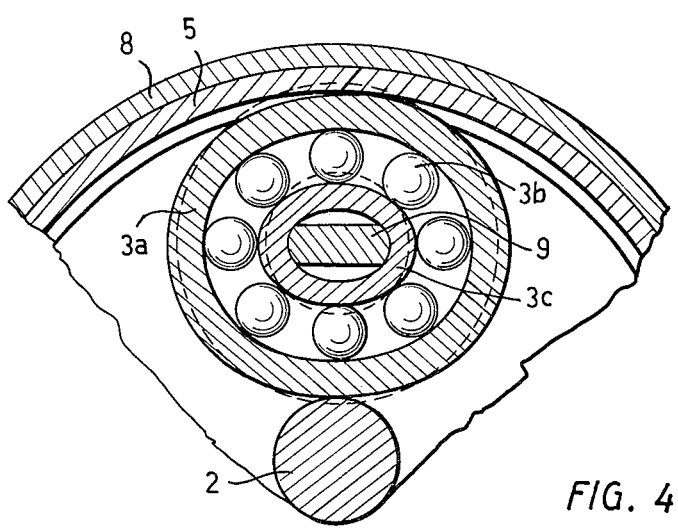
Figure 6:
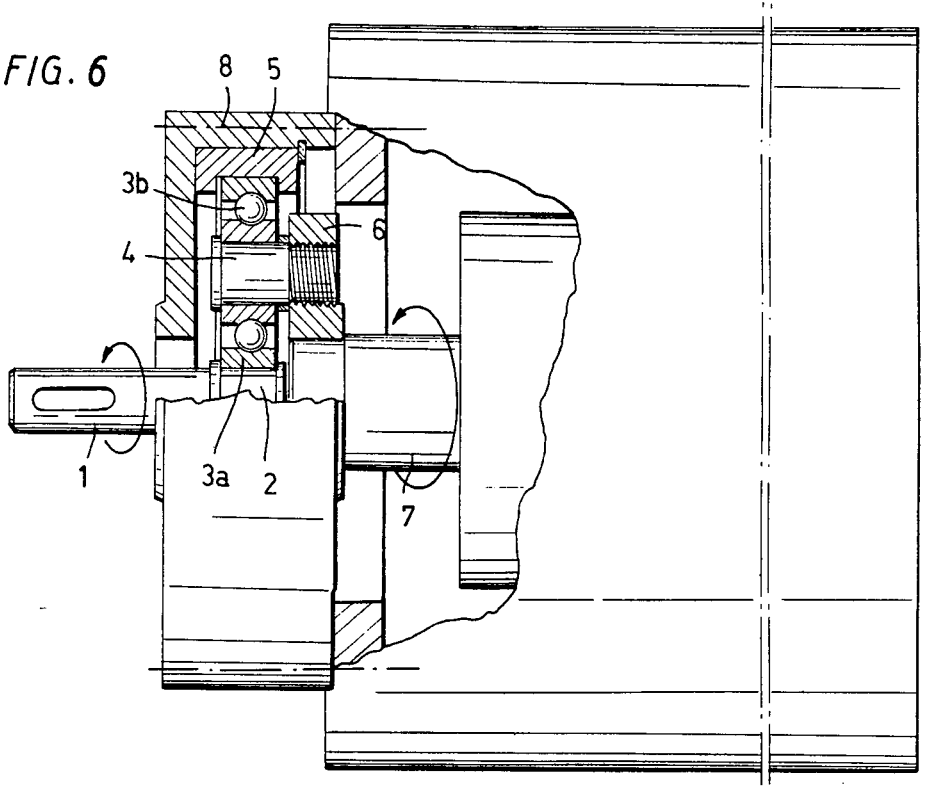
Figure 7:
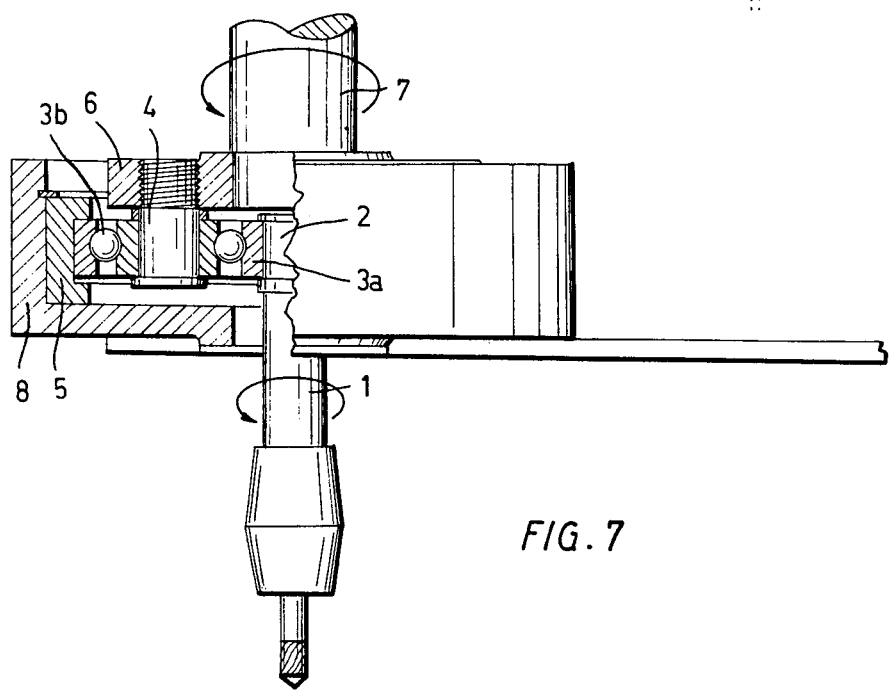

In the following the invention will be described in detail with reference to the enclosed drawings, wherein FIGS. 1 and 2 show a basic embodiment of the gear, FIGS. 3 and 4 show a preferred embodiment, FIG. 5 shows the bearing gear as a reduction gear in connection with an electric motor, FIG. 6 shows the bearing gear as an increase gear in connection with an electric motor, FIG. 7 shows increasing of the spindle speed of a machine tool by means of the bearing gear.

The gear shown in FIG. 1 comprises a first shaft 1 which shows a centre ring 2 at its end. Planet wheels 3 which are formed of standard-manufactured ball bearings or supporting rollers, are attached to axles 4, and the outer ring 3a of the planet wheel acts as a roller element between the centre ring 2 and an outer support ring 5. The axle 4 is attached to a flange 6 which again is attached to a second shaft 7. The outer ring 5 is attached to a frame 8 which can be attached to a rigid support, a driving motor, or, in some cases, can remain as a rotating driving element. Ring 5 and frame 8 together form the casing of the gear which casing as well may be made in one piece. The centre ring 2 can be e.g. the inner ring of an ordinary bearing. For moment transmission the outer ring 3a of the planet wheels must by means of adequate pressure be pressed between the centre ring 2 and the outer ring 5. This may be achieved by means of standard-manufactured tightening devices applied either around the outer ring 5, or inside the inner ring 2. Also tighteners can be used to achieve the required pressure between the various structural elements.

To obtain a high power transmission capacity, the compressive force to which the planet wheels are subjected between the casing 5, 8 and the shaft 2 is so great that the outer ring 3a of the planet wheels will become somewhat oval, and pressure will be exerted on balls 3b causing rapid wearing of the same. In order to avoid this and let the balls 3b roll freely, the inner ring 3c of the planet wheel which ring during rotation of the planet wheel is not turned in relation to the casing nor the shaft is made correspondingly oval. In the embodiments shown in FIGS. 3 and 4, this is accomplished by means of a so-called lightened axle 9 which does not fill up the entire ring 3c, but the dimension whereof perpendicular to the radius of the casing 5, 8 and the shaft 2 is so much bigger than the normal inner diameter of the ring 3c that the ring 3c will have the same shape as the ring 3a. Alternatively, an axle having an oval cross section and filling up the entire ring 3c can be used. In FIG. 4, the free shape of the rings 3a and 3c is indicated with broken lines, for the sake of clarity the deformations are exaggerated. A press fit is formed between the inner ring 3c of the planet wheel and the axle 9, said fit preventing the inner ring from rotating in relation to the axle.

The gear may be used for increasing or decreasing rotational speed, or for reversing the direction of rotation. The input and takeout of power depend on the desired gear ratio and the desired use of the gear.

In a one step embodiment the practical gear ratio range is, when increasing the rotational speed, 14:1 ... 14:13, and when decreasing the rotational speed, 1:14 .. . 13:14.

The capacity of the gear according to the invention to tolerate high rotational speeds is very good, since it is only limited by the tolerance of the planet wheels acting as bearings. The bearing gear thus tolerates rotational speed considerably better than, for instance, a cog wheel gear (10KW max. approx. 10,000 r/min).

To obtain an especially great gear ratio, e.g. for regulation purposes two gears according to the invention may be coupled in series. In such a case the planet wheels of the both steps are in driving contact with the primary shaft and are arranged coaxially on a common flange which is freely rotatable in such a way that its rotation is only limited by the planet wheels of each step. The outer diameter of the planet bearing in the second step is sightly wider than the outer diameter of the planet bearing in the first step, whereas the casing of the second step connected to the secondary shaft will rotate at a speed lowered with a very great gear ratio in relation to the primary shaft. The gear ratio is freely selectable and when the diameters of the planet wheels approach each other, the gear ratio approaches the infinite. Then a very slow regulating movement can be obtained for the secondary shaft by means of a very fast-rotating motor driving the primary shaft. Alternatively, the diameter of the planet wheels in both steps can be the same, and their axial relation to each other in the direction of the radius can be displaced.

Bearings suitable for planet wheels are available as standard components having a sufficient radial strength and mountable under pressure between the outer and inner rings to achieve a frictional force of sufficient magnitude to ensure the same transmission capacity as for a cog wheel gear of the same dimension class.

The power transmission capacity of the gear of the invention is in each dimension class (transmitted power/size of gear and/or weight) better than for cog wheel gears, provided that higher rotational speeds can be used.

Even the efficiency of the gear is better than that of cog wheel gears, and the gear is heated considerably less. Losses are caused mainly by deformation of metal due to compression between the planet rings as well as rolling and lubrication friction.

Since the gear operates at the same time also as a bearing, it is in an ordinary loading situation considerably over-dimensioned against radial loads. Only in case that one shaft is charged with a considerable axial load, the system requires an extra bearing.

As far as practical embodiments are concerned, it can be mentioned that the bearing gear is suited for all those ranges of use where nowadays planet gears are used. In addition the better tolerance of high rotational speeds of the bearing gear enables several new applications in connection with various machine tools. Due to cheap and small construction of the gear of the invention, its most preferable use is in series produced gears.

Especially well can all qualities of the gear be taken advantage of when it is connected with a driving element and replaces a bearing of the driving element. Such a use of the gear is as flange gear, e.g. in connection with an electric motor, in which case the same power-transmitting planet bearings can be used for both the shaft of the electric motor and the output shaft.

What we claim is:

1. A planetary gear with friction planet wheels, comprising an outer casing, first and second shafts and a plurality of friction planet wheels transmitting power from one shaft to the other and each having an axle, an inner ring which is fixedly mounted on the axle, an outer ring surrounding the inner ring, and rollable elements contained between the inner ring and the outer ring and permitting the outer ring to rotate about the inner ring, and the gear further comprising a flange attached to said first shaft and having the axle of the planet wheels connected thereto, the outer rings of the planet wheels being arranged as rollers between the casing and the second shaft, and the friction planet wheels thus constituting the sole radial bearing for the casing and first and second shafts, the inner ring of each planet wheel being oval in shape in order to facilitate movement of the rollable elements and to relieve point pressure exerted on said rollable elements by virtue of the outer ring being rendered oval in shape by pressure exerted thereon by the outer casing.

2. A planetary gear according to claim 1, wherein the oval form of the inner ring of each planet wheel is achieved by means of the axle upon which said inner ring is mounted, said axle being dimensioned sightly bigger than the normal diameter of the inner ring in a direction perpendicular to the radius of the casing through the contact points between the outer ring and the casing and between the outer ring and the second shaft.

3. A planetary gear according to claim 2, wherein the planet wheel axle is a so-called lightened axle which does not entirely fill the inner ring.

4. A planetary gear according to claim 2, wherein the planet wheel axle is oval in cross section and fills the inner ring entirely.

* * * * *